Figure 1:
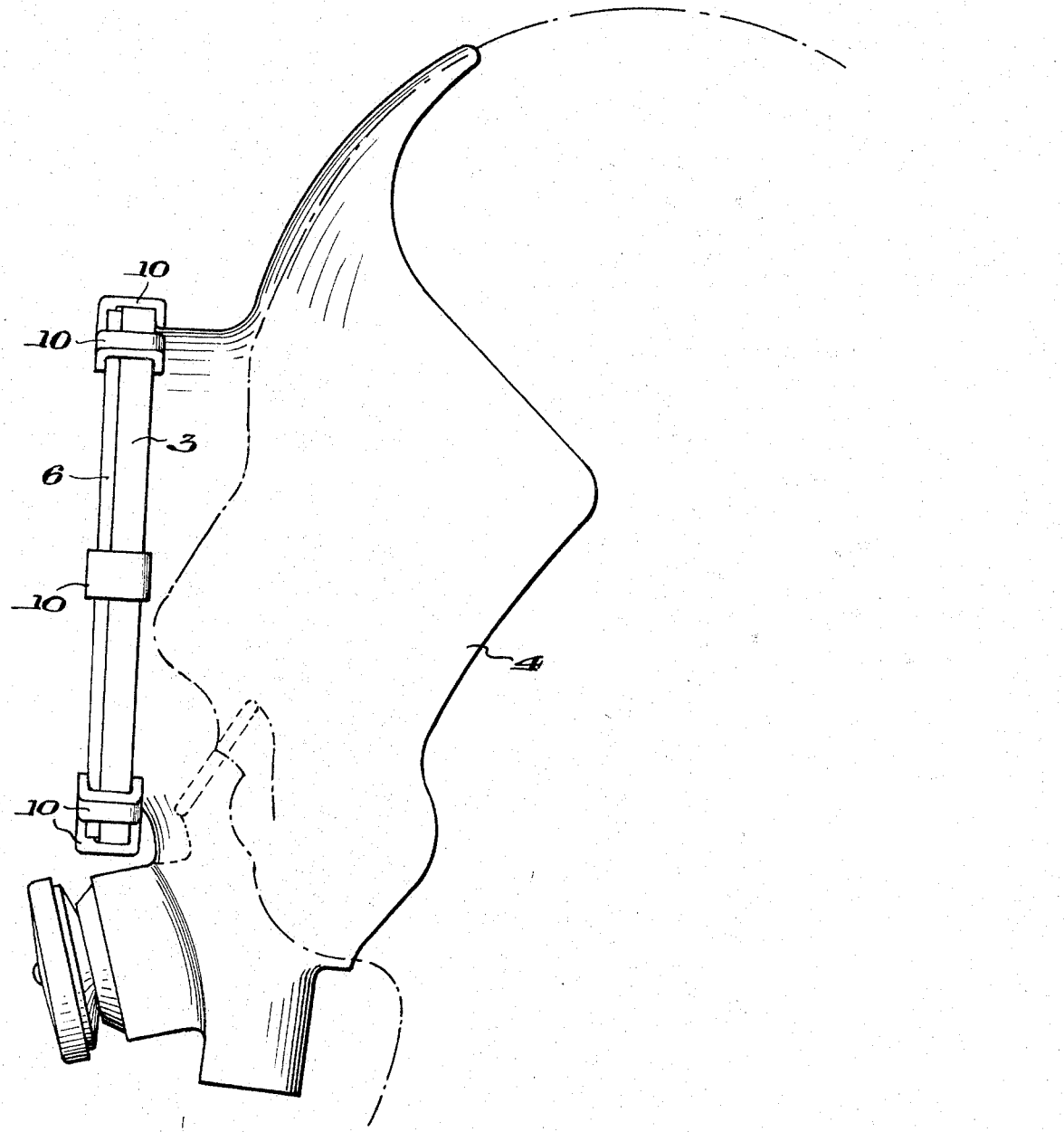

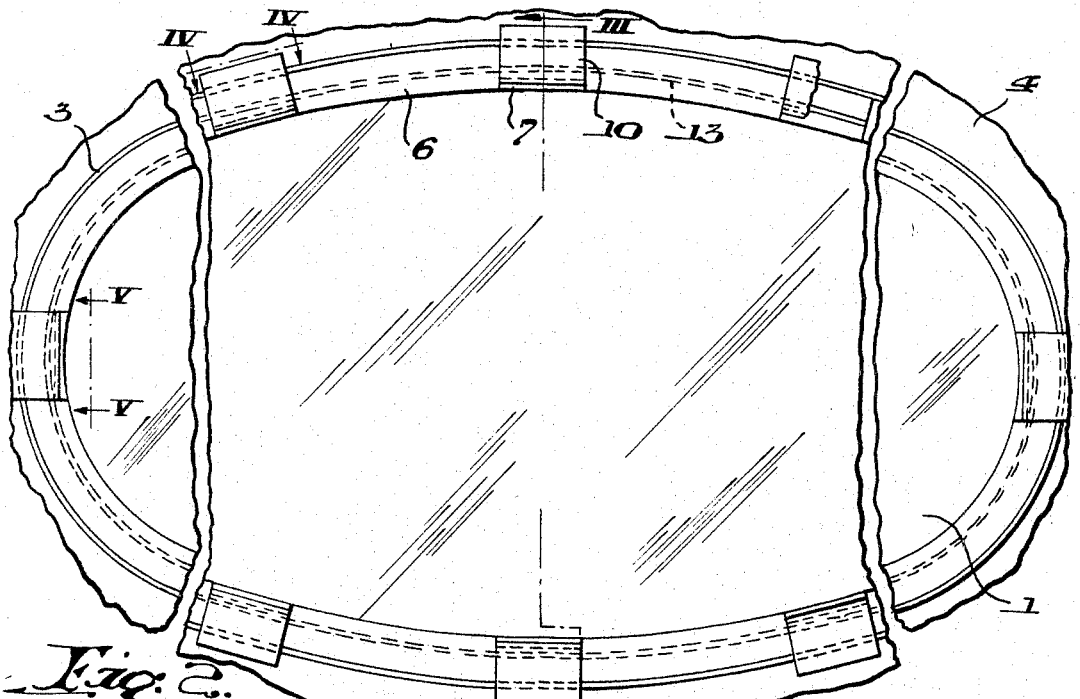
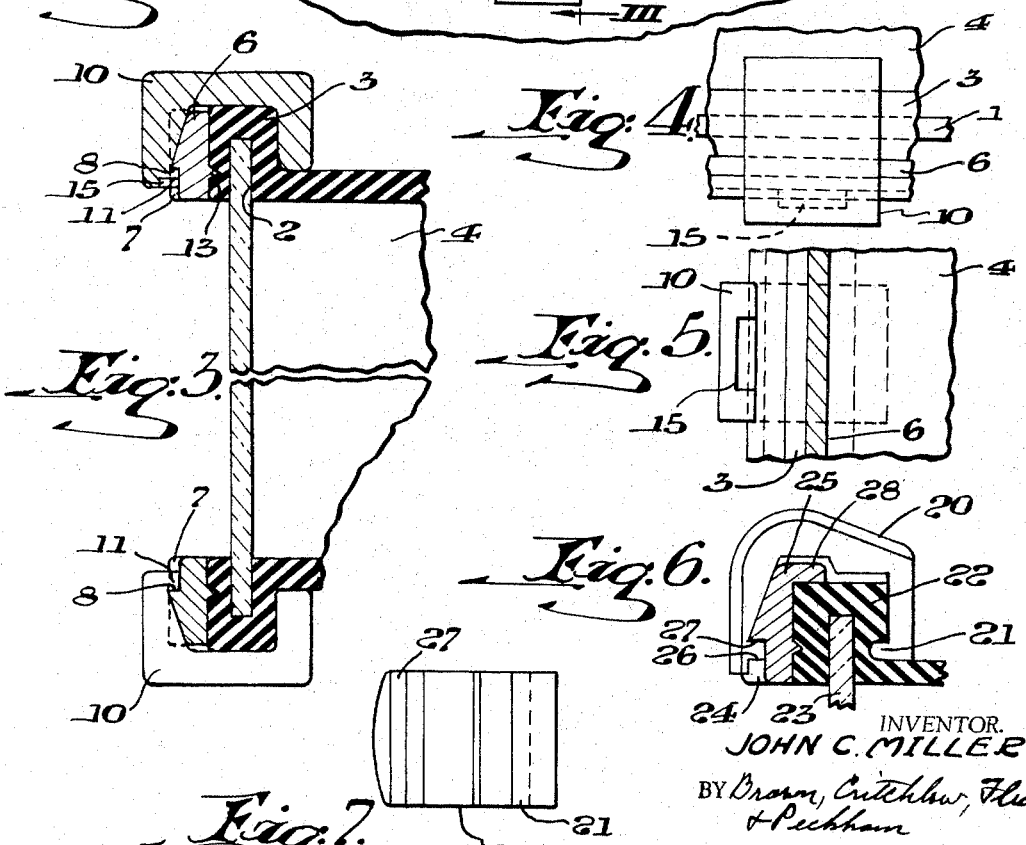

United States Patent Office 3,323,135
Patented June 6, 1967

3,323,135
MASK LENS RETAINER AND SEAL
John C. Miller, Pittsburgh, Pa., assignor to Mine Safety Appliances Company, a corporation of Pennsylvania
Filed Sept. 2, 1965, Ser. No. 484,627
7 Claims. (Cl. 2—14)

This invention relates to frames for lenses, such as in gas masks and the like, and more particularly to means for retaining and sealing the lenses in the frames.

It is among the objects of this invention to provide simple and inexpensive means for quickly and effectively clamping and sealing the edge of a lens in a frame around the sight opening of a protective mask.

In accordance with this invention, a stiff ring has one side in engagement with one side of a compressible frame provided in its inner surface with a groove that receives the marginal portion of a lens. The opposite side of the ring is provided at circumferentially spaced points with recesses, each of which has a shoulder facing toward the center of the ring. At each recess there is a C-shaped spring clip that straddles the ring and frame and marginal portion of the lens. One end portion of the clip engages the side of the frame opposite to its ring side, while the opposite end portion of the clip is seated tightly against the ring in the recess and has a transverse lip overlapping and engaging the shoulder to lock the clip in place. The clips hold the ring and lens and frame tightly together.

The invention is illustrated in the accompanying drawings, in which

FIG. 1 is a side view of a mask;
FIG. 2 is an enlarged fragmentary front view of the mask;
FIG. 3 is a still further enlarged vertical section taken on the line III—III of FIG. 2;
FIG. 4 is an enlarged fragmentary plan view taken on the line IV—IV of FIG. 2;
FIG. 5 is an enlarged fragmentary vertical section taken on the line V—V of FIG. 2;
FIG. 6 is a side view of a modified clip, with the adjoining elements shown in section; and
FIG. 7 is a view looking into the clip shown in the preceding figure.

Referring to FIGS. 1 to 5 of the drawings, a protective lens 1 has its edge mounted in a groove 2 in the inner surface of a surrounding frame 3. The frame is made of compressible material, such as rubber or the like, and may be carried by any suitable means. The drawings show the frame surrounding and defining the large sight opening in the front of a gas mask 4, with which the frame is integral. The frame projects outward from the sight opening and therefore has exposed front and rear sides. The lens extends entirely across the front of the mask.

It is a feature of this invention that frame 3 is compressed tightly against the opposite sides of the marginal portion of the lens in its groove, whereby to hold the lens securely in place and to form a good seal between the frame and lens. Accordingly, a relatively stiff pressure ring 6 of metal or plastic is placed against the front side of the frame. Preferably, the ring is nearly as wide as the adjoining frame. The opposite or front side of the ring is provided with a number of circumferentially spaced notches or recesses 7, each of which has an inner or back wall and substantially parallel side walls. The number of recesses will depend on the size and shape of the ring, eight recesses being considered adequate for the ring shown in FIG. 2. The inner wall of each recess is provided with a transverse shoulder 8 facing toward the inside of the ring. This shoulder is spaced a short distance from the inner surface of the ring. The inner wall of the recess between its shoulder and the outside or periphery of the ring slopes backwardly from the shoulder.

Disposed in each of the pressure ring recesses is the front end portion of a C-shape spring clip 10, which straddles the ring and frame and marginal portion of the lens, with the rear end portion of the clip engaging the back side of the frame. The clip is seated tightly against the ring in the recess and has a sloping surface engaging flat against the sloping wall of the recess. The clip also is provided near its front end with a transverse lip 11 that projects rearwardly to overlap and engage the recess shoulder 8 in order to lock the clip in place.

Each clip is applied to the compressible frame and the ring by snapping the clip in place. This is done by placing the rear end of the clip against the back of the frame, with the lip 11 engaging the sloping wall of a recess 7. The front end portion of the clip then is pushed inwardly to cause the lip to slide inwardly along the sloping wall until it snaps over shoulder 8. There is enough give or spring in the clip to allow its end portions to be sprung apart far enough to permit the lip to move into place. Also, when pressure is applied to the clip to snap it into place, the clip compresses the frame. The normal size of the clips is such that when they are in place they compress the frame between the pressure ring and the rear portions of the clips. Therefore, the frame is pressed tightly against opposite sides of the lens in groove 2 so that there can be no leakage between the lens and frame. To increase the pressure of the frame against the lens, the back side of the ring may be provided with an integral rib 13 that extends around it and that presses into the frame. The portion of the frame directly behind the rib therefore is pressed more tightly against the lens than is the remaining portion of the frame.

In order to permit the clips to be removed easily in case it becomes necessary to replace a broken lens, the end surface of each clip may be provided with a notch 15 for receiving a screwdriver or the like, by which the clip can be sprung open far enough to permit its lip to ride over the adjoining shoulder and onto the sloping wall of the recess.

It will be seen that with this invention a ring can be quickly sealed in the compressible frame by simply placing the pressure ring against the front face of the frame and then snapping the clips in place. When that has been done, there is no way for the lens to escape from the frame and leakage cannot occur between the frame and lens.

In the modification shown in FIGS. 6 and 7, the rear end of each clip 20 is provided with a transverse rib 21 that presses into the adjoining back side of the compressible frame 22 for a lens 23. This securely anchors the rear end of the clip, while the front end portion of the clip is seated in a recess 24 in a pressure ring 25 engaging the front of the frame. The clip is locked in place by means of a transverse lip 26 engaging an inwardly facing shoulder 27 in the recess. The inside of the clip is shaped so that it can receive a flange 28 projecting rearwardly from the outer edge of the pressure ring all around the frame, the outer surface of which the flange engages. Such a flange helps locate the ring and hold it in proper position while the clips are being applied. The front end of this clip, instead of being provided with a notch for receiving a screwdriver for removing the clip, simply projects beyond the lip to form a space for receiving such a tool.

Although the lens has been shown flat, it will be understood that the invention also is applicable to transversely curved lenses. In fact, it has special utility with curved lenses because they present a greater sealing problem, which this invention solves satisfactorily.

According to the provisions of the patent statutes, I have explained the principle of my invention and have illustrated and described what I now consider to represent

I claim:

1. The combination with a lens and a compressible frame therefor having a groove in its inner surface receiving the marginal portion of the lens, of a stiff ring having one side engaging one side of said frame, the opposite side of the ring being provided at circumferentially spaced points with recesses each having a shoulder facing toward the center of the ring, and a C-shape spring clip at each recess straddling the ring and frame and marginal portion of the lens and having one end portion engaging the side of the frame opposite to said first-mentioned side of the frame, the opposite end portion of the clip being seated tightly against the ring in said recess and having a transverse lip overlapping and engaging the shoulder therein to lock the clip in place, the clips holding said ring and lens and frame tightly together.

2. The combination recited in claim 1, in which said one side of the ring is provided with an integral rib extending around it and pressing into the adjoining frame.

3. The combination recited in claim 1, in which said ring is provided with a flange surrounding and engaging the outer surface of said frame.

4. The combination recited in claim 1, in which each clip has a portion projecting beyond said lip and spaced from the inner wall of said recess.

5. The combination recited in claim 1, in which said one end portion of each clip is provided with an integral transverse rib pressing into the adjoining frame.

6. The combination recited in claim 1, in which the inner wall of each ring recess slopes from its shoulder away from said opposite side of the ring toward its periphery.

7. The combination recited in claim 6, in which each clip engages flat against the sloping wall of the recess in which the clip is seated.

References Cited

UNITED STATES PATENTS

| | | | |
|---|---|---|---|
| 2,060,823 | 11/1936 | O'Leary | 2—14.7 |
| 2,723,427 | 11/1955 | Bohel | 52—502 |
| 2,910,062 | 10/1959 | Potash | 128—146 X |
| 2,956,474 | 10/1960 | Holzwarth et al. | 2—14.2 X |
| 2,996,722 | 8/1961 | Jacobs | 2—14.6 |
| 3,259,127 | 7/1966 | Klinger et al. | 2—14 X |

FOREIGN PATENTS 252,725    6/1964    Australia.

JORDAN FRANKLIN, *Primary Examiner.*

H. F. ROSS, *Examiner.*